Feb. 13, 1945.  F. D. BRADDON ET AL  2,369,131
TURN ERROR PREVENTING MEANS FOR GYRO-VERTICALS
Filed Dec. 19, 1940  2 Sheets-Sheet 2
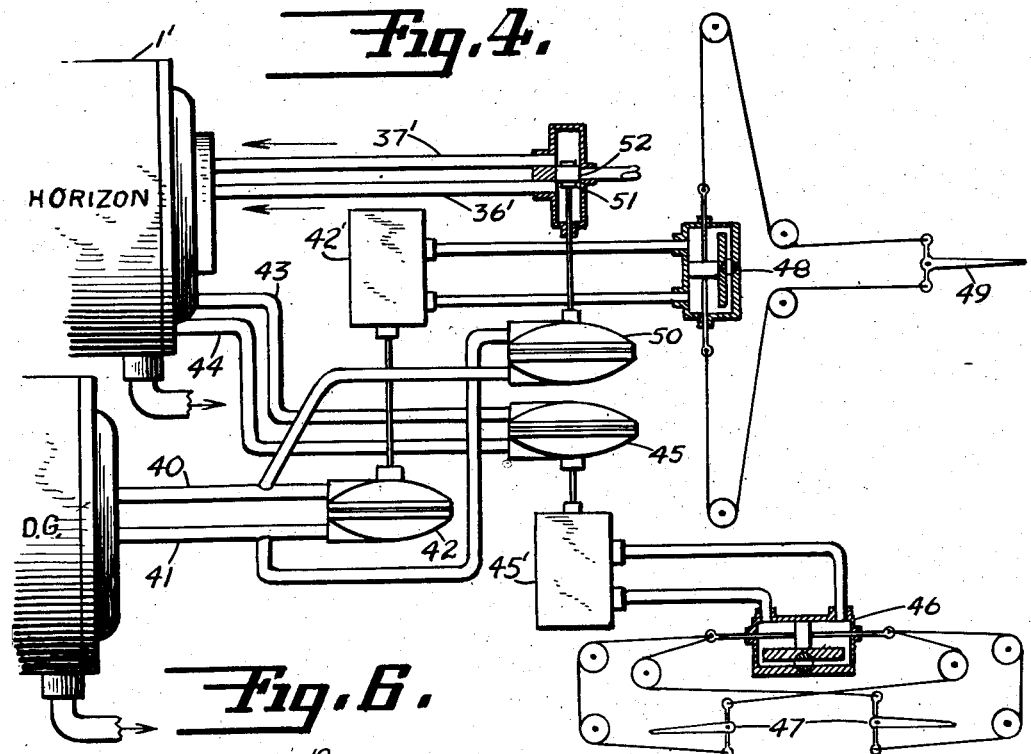
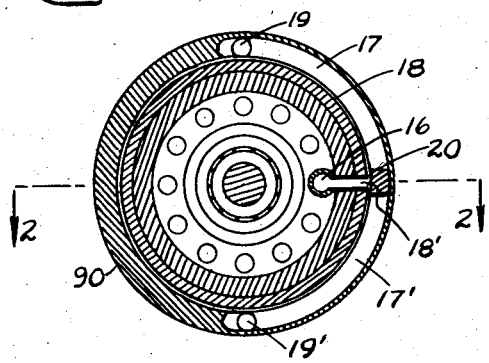
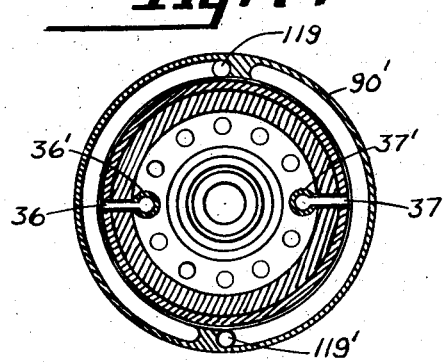
INVENTORS
FREDERICK D. BRADDON and
LESLIE F. CARTER
BY
Herbert H. Thompson
their ATTORNEY.

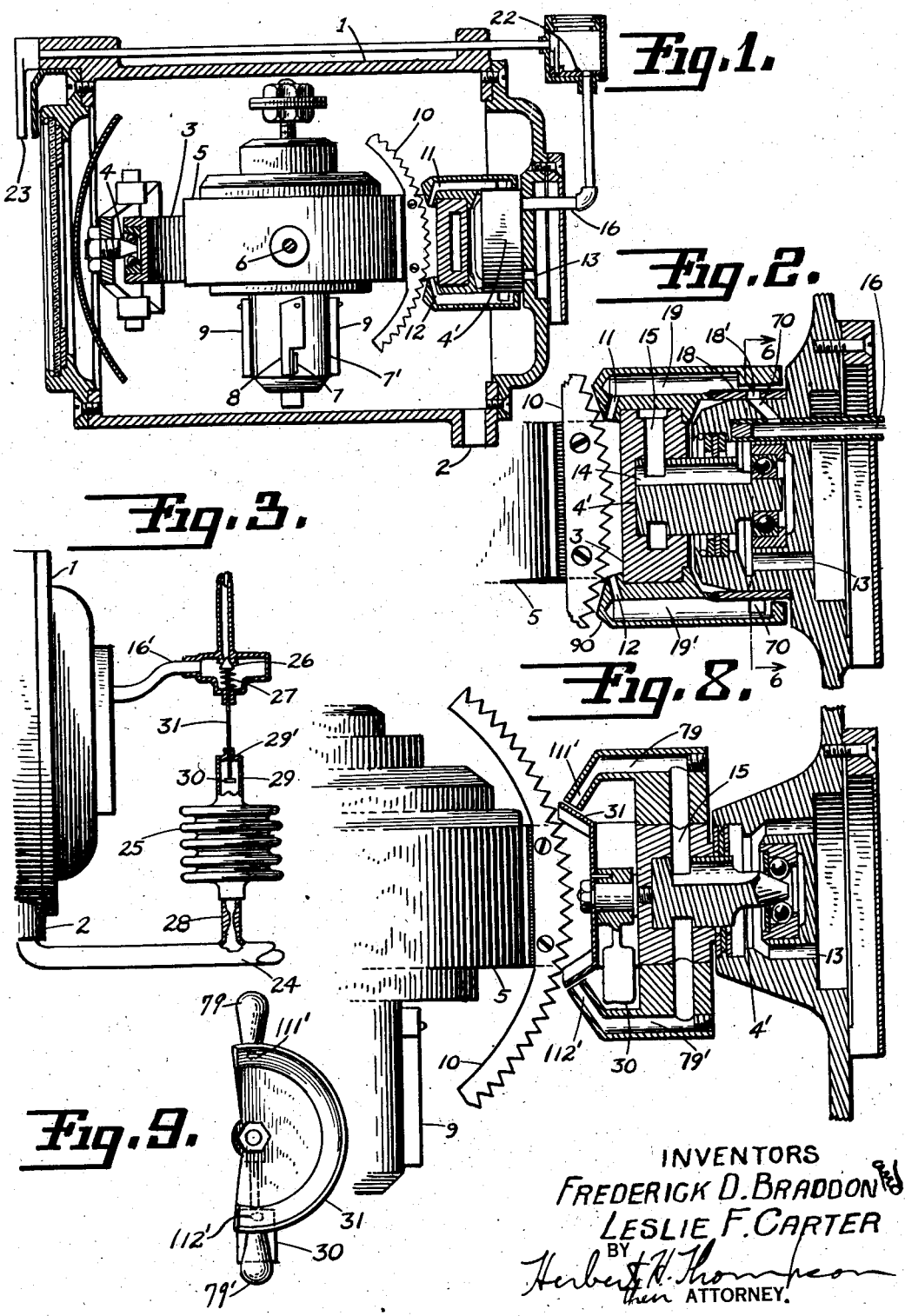

Patented Feb. 13, 1945

2,369,131

UNITED STATES PATENT OFFICE 2,369,131

TURN ERROR PREVENTING MEANS FOR GYRO-VERTICALS

Frederick D. Braddon, Babylon, N. Y., and Leslie F. Carter, Leonia, N. J., assignors to Sperry Gyroscope Company, Inc., Brooklyn, N. Y., a corporation of New York Application December 19, 1940, Serial No. 370,828

13 Claims. (Cl. 244—79)

This invention relates to neutrally mounted gyro-verticals or gyroscopic artificial horizons which are erected by gravitationally controlled sources of power. The principal source of error in such instruments arises during turning of the craft which displaces the gravitational elements and hence causes a tilt of the gyroscope during a turn which persists after the turn. While we are aware that many attempts have been made to overcome this difficulty, most of the prior attempts involved the use of extra gyroscopes, such as a rate of turn gyroscope, to bring into action a means for eliminating or counteracting the erection force during turns. According to our invention, however, we propose to further this purpose without any auxiliary gyroscope and without placing any additional apparatus upon or within the sensitive gyroscope. In other words, we make use of some reversible phenomenon on the craft which naturally accompanies turning in one direction or the other, such as banking, a turn signal to the rudder, and so forth.

Referring to the drawings, showing several forms our invention may assume,

Fig. 1 is a longitudinal section of the casing of a gyro-vertical, the gyro casing being shown in elevation.

Fig. 2 is an enlarged longitudinal section of the rear bearing of the same.

Fig. 3 is a detail, partly in section, showing a modified form of the invention.

Fig. 4 is a diagrammatic view showing a still further modification adapted for employment when the airplane is equipped with an automatic pilot.

Fig. 5 is a still further modification.

Fig. 6 is a vertical section taken substantially on line 6—6 of Fig. 2.

Fig. 7 is a similar section of the form of gyroscope used in Figs. 4 or 5.

Fig. 8 is a sectional detail through the rear bearing of another modification of a gyroscope.

Fig. 9 is a face view of the erecting nozzles and cut-off plate of Fig. 8.

In the drawings, we have shown our invention as applied to the standard form of gyroscopic artificial horizon enclosed within outer casing 1, from which air is exhausted through pipe coupling 2. The gyroscope proper is shown as universally supported within the case by means of a gimbal ring 3 journaled on major axis 4, 4' within the outer case, the rotor bearing case 5 being journaled within the gimbal on minor axis 6. The rotor (not shown) may be spun by any suitable means, such as air jets, and the gyroscope rotor casing is normally maintained erect by means of a plurality of oppositely directed discharge ports 7 and 7' controlled by a pair of small pendulous shutters 8 and 9, or other gravitationally responsive elements, as is well known in the art, this being illustrated in U. S. Patent 1,982,- 636 to Carlson. Major axis 4, 4' and minor axis 6 may be disposed in any desired normally horizontal positions on the aircraft. For simplicity of mounting and adjustment, it is usually desirable, however, to make these axes parallel to the longitudinal, or fore and aft, and the transverse, or lateral, axes of the craft, about which roll and pitch occur. Ports 7, 7' are usually located parallel to these gyro axes. The reactions of the air jets issuing from these ports supply the erecting torques for keeping the gyro rotor axis vertical, under the control of pendulous shutters 8 and 9. Such pendulums are, of course, subject to centrifugal forces as well as the force of gravity and hence swing outwardly on turns. Instead of attempting to render the ports 7 inoperative during turns, as has been done in the prior art we propose to apply a counteracting torque around the minor axis of the gyroscope equal and opposite to the upsetting torque due to the fore and aft pair of ports 7' during turns. For this purpose, we have shown the gyro rotor casing as provided with a toothed sector torque quadrant 10, with opposing ports or nozzles 11 and 12 adjacent thereto and adjacent trunnion 4' to exert a torque on the gyroscope about lateral axis 6 during turns.

The air for spinning the rotor and for activating the erection device is shown as entering casing 1 through a plurality of openings 13 in the case 1 adjacent the trunnion 4'. From thence, the air passes through passage 14 in the trunnion to enter a channel 15 in the gimbal ring 3, the air thence passing around through the minor axis of the gyro and into the gyro rotor case 5 through channels not shown. Separate air channels are shown for the nozzles 11 and 12, this air entering through the pipe 16. Thence the air passes outwardly through passage 70, thence through a port 18' in ring 18. Normally, this port 18' is closed by the block 20 (Fig. 6) which separates two annular channels 17, 17' within a hollow member 90 clamped to gimbal ring 3. Channels 17 and 17' lead respectively to channels 19 and 19' connected to the respective jets 11 and 12, but upon bank of the aircraft through a substantial angle in either direction, the block 20 is displaced away from the port 18' in one direction or the other, resulting in air flow being directed into one or the other of channels 17, 17' to cause a jet to issue from the connected port 11 or 12, thereby exerting a precessing force or torque in the proper direction on the gyroscope to counteract forces which would otherwise cause a tilt.

In order to prevent this counteracting torque from operating during the initial setting of the gyroscope, we have shown the pipe 16 as having a valve 22 therein which may be controlled from a handle 23 at the front of the instrument to shut off the air supply to the pipe during starting operations or starting-up period. An automatic method of performing this function is shown in Fig. 3. In this figure the exhaust pump is connected to the gyro casing through pipe 24. Connected to this pipe is a delayed action device including a Sylphon or metallic bellows 25 which is normally in its expanded position as shown in Fig. 3, in which position the valve 26 in the supply pipe to pipe 16' is held seated by spring 27. When the vacuum source is connected to the pipe 24 to start the gyroscope, the bellows 25 slowly contracts by having air slowly withdrawn therefrom through the restricted connection 28 to pipe 24 so that a short time after the gyroscope has started and after there has been time for the same to become erected, the closure 29' on extension 29 from the bellows strikes the collar 30 on the stem 31 of valve 26 and opens the same.

Another simple means for bringing into action the erecting torque is shown in Figs. 8 and 9. According to this form of the invention, an auxiliary pendulum 30 is employed to control a shutter 31 which normally blocks or cuts off the jets from the ports 111' and 112' fed through pipes 79 and 79' from channel 15, but upon a marked turn the pendulum will swing out in one direction or the other with respect to the ports 111' and 112', which are on the stabilized gimbal ring, and therefore bring one port out from under the shutter (see Fig. 9) to exert an erective torque on the gyro. It should be noted that the shutter overlies the ports for a substantial angle so that the ports are not uncovered unless a substantial turn takes place.

Still another method of controlling the erective torque is by means of a valve actuated from the means on the craft causing a turn, such as the rudder R of the aircraft. A simple means of effecting this purpose is illustrated diagrammatically in Fig. 5, in which a shut-off valve 32, pivoted at 33, is connected at its outer end by a slide connection 34 with one of the rudder cables 35 so that, on substantial movement in one direction or the other from its central position, the port 36 or 37 is uncovered, which lead air in through pipes 36' and 37' within the modified trunnion structure shown in Fig. 7, thus supplying air to the nozzle pipes 119 and 119'.

If the airplane is equipped with an automatic pilot, the turn signals from the directional gyroscope or other course maintaining means may be employed. This construction is illustrated diagrammatically in Fig. 4, in which the course maintaining or directional gyro is marked D. G. and the horizon gyro case is at 1'. The differential air signals from the directional gyroscope are shown as transmitted through pipes 40 and 41 to the relay valve 42, 42' which controls the rudder servo motor 48 and rudder 49. The corresponding bank or roll signals from the horizon are represented as transmitted through pipes 43, 44 to relay valve 45, 45', hence actuating the aileron servo motor 46 and ailerons 47. Such construction may be of the standard type, as shown in the patent to B. G. Carlson, E. A. Sperry and M. F. Bates, No. 1,992,970. Tapped into the pipes 40 and 41 is shown an additional relay valve arrangement 50, so that the valve 51 is displaced from its central position whenever a turn or course change signal is transmitted, opening intake port 52 to admit air into intake pipe 36' or 37', dependent upon the direction of the signal. In this case the gyro trunnion may again be constructed as shown in Fig. 7.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a neutral, universally mounted gyro-vertical for aircraft having a rudder, means for applying torques on the gyroscope about its lateral and fore and aft axes, gravitationally responsive means for controlling said torques and responsive to relative tilt of the gyroscope and gravitational means about the fore and aft and lateral axes, respectively, and means responsive to turning of the aircraft rudder in either direction from its normal position for applying a counteractive torque on the gyroscope in one direction or the other about said lateral axis.

2. In a universally mounted gyro-vertical for aircraft, a rotor frame, a gimbal ring by which said frame is pivoted about a lateral minor axis and a major fore and aft axis on said craft, means for applying torques on the gyroscope about its lateral and fore and aft axes, gravitationally responsive means for controlling said torques and responsive to relative tilt of the gyroscope and gravitational means about the fore and aft and lateral axes, respectively, a pair of jets mounted on said gimbal ring adjacent said major axis for directing jets of air to apply torque in one direction or the other about the lateral axis thereof, and a pendulous shutter adjacent said ports normally cutting off both but uncovering one port or the other upon substantial swing of the pendulum from its vertical position.

3. In a universally mounted gyro-vertical for aircraft, a rotor frame, a gimbal ring by which said frame is pivoted about a lateral minor axis and a major fore and aft axis on said craft, means for applying torques on the gyroscope about its lateral and fore and aft axes, pendulous means for controlling said torques and responsive to relative tilt of the gyroscope and pendulum about the fore and aft and lateral axes, respectively, a pair of jets mounted on said gimbal ring adjacent said major axis for directing jets of air to apply torque in one direction or the other about the lateral axis thereof, and reversible means responsive to phenomena accompanying turning of the craft in one direction or the other for directing air through one or the other of said jets in accordance with the direction of turn.

4. In an automatic pilot for aircraft having a direction maintaining control device having course change means thereon and an attitude maintaining control device, the latter including a neutrally mounted gyro-vertical controlled by gravitationally responsive means, a rudder servo motor actuated from course change signals from the course change means and means responsive to said course change signals for causing corrective torques to be exerted on said gyro-vertical to prevent tilt during turns.

5. A neutral, universally mounted, gyro-vertical including means for applying torques on the gyroscope about the lateral and fore and aft axes of the gyroscope, gravitationally responsive means for controlling said torques and responsive to relative tilt of the gyroscope and gravitational means about said fore and aft and lateral axes, respectively, additional means for applying a torque about the lateral axis of the gyroscope upon banking of the craft beyond a predetermined angle, and automatic means for preventing the operation of said last named means during the starting up period of said gyro-vertical including a delayed action device slowly responsive to the initiation of the supply of energy for spinning the gyroscope.

6. A neutrally mounted gyro vertical for aircraft, comprising a housing, a gyro rotor casing, means for universally mounting said casing in said housing for rotation about the longitudinal and transverse axes of said craft, pendulous means, erecting means responsive to tilt of said casing with respect to said pendulous means for maintaining said casing substantially vertical, a toothed sector torque quadrant fixed to said casing, a pair of air jets rotatable about said longitudinal axis with said casing and sector and adapted to create gyro precessing forces on said sector, and reversible means responsive to a phenomenon inherent in the turning of the craft in one direction or the other for supplying air pressure to one or the other of said jets to oppose the effect of said tilt responsive erecting means about said longitudinal axis.

7. A neutrally mounted gyro vertical for aircraft comprising a housing, a gyro rotor casing, means for universally mounting said casing in said housing for rotation about two normally horizontal axes, a toothed sector torque quadrant fixed to said casing, a pair of air jets rotatable about one of said axes with said casing and sector and adapted to apply precessing forces on said sector about said other axis, and means responsive to relative tilt of said casing and jets with respect to said housing for supplying air pressure to one or the other of said jets to exert torque on the gyroscope.

8. A neutrally mounted gyro vertical for aircraft comprising a housing, a gyro rotor casing, means for universally mounting said casing in said housing for rotation about two normally horizontal axes, gravitationally responsive means, erecting means responsive to tilt of said casing with respect to said gravitational means for maintaining said casing substantially vertical, a toothed sector torque quadrant fixed to said casing, means including a pair of air jets rotatable about said one of said axes with said sector and casing for creating precessing forces on said sector about said other horizontal axis to oppose the effect of said tilt-responsive erecting means acting about said other axis in response to relative tilt of said gyroscope and housing about said first axis.

9. A neutrally mounted gyro vertical for aircraft comprising a housing, a gyro rotor casing, means for universally mounting said casing in said housing for rotation about two normally horizontal axes, erecting means for maintaining said casing substantially vertical, means including a pair of air jets rotatable about one of said axes with said casing and also including a pendulous controller for differentially controlling the air supply to said jets, for opposing the effect of said erecting means about said one axis in response to relative tilt beyond a predetermined amount of said casing and pendulous controller.

10. A neutrally mounted gyro vertical for aircraft having a rudder, comprising a housing, a gyro rotor casing, means for universally mounting said casing in said housing for rotation about two normally horizontal axes, tilt-responsive erecting means for maintaining said casing substantially vertical, means including a pair of normally inoperative air jets stabilized about one of said axes by said casing for opposing the effect of said erecting means about said one axis, and means for bringing one or the other of said jets into operation responsive to movement of the rudder of the craft in one direction or the other away from its centralized position.

11. A neutrally mounted gyro vertical comprising a housing, a gyro rotor casing, means for universally suspending said casing within said housing for rotation about two mutually perpendicular normally horizontal axes, means for maintaining said casing substantially vertical, means independent of said last means and responsive to tilt of said casing with respect to said housing for opposing at least a portion of said vertical-maintaining means, and automatic means for preventing the operation of said opposing means during the starting-up period of the rotor, including a delayed action device responsive to the supply of energy to spin the rotor.

12. A neutrally mounted gyro vertical for aircraft comprising a housing, a gyro rotor casing, means for universally mounting said casing in said housing for rotation about two normally horizontal axes, tilt-responsive erecting means for maintaining said casing substantially vertical, means for eliminating the effect of said erecting means about one of said axes in response to banking of said craft beyond a predetermined bank angle.

13. A neutrally mounted gyro vertical comprising a gyro rotor casing, a gimbal ring within which said casing is pivoted for oscillation about a minor horizontal axis, said gimbal ring in turn being pivoted for oscillation about a major horizontal axis normal to said minor axis; a toothed sector on said casing concentric with said minor axis, a pair of normally ineffective air jets mounted on said gimbal ring adjacent said sector and adapted, when rendered effective, to apply a torque in either direction on said casing about said minor axis, and means responsive to a phenomenon inherent in the turning of the craft for causing differential air flow through said jets to apply torque in one or the other direction on said casing about said minor axis.

FREDERICK D. BRADDON.
LESLIE F. CARTER.